3,076,031
PROCESS FOR STABILISING ARYL-SULPHONE-ALKYL- OR -ALKANOL-AMINES
Otto Schweitzer, Frankfurt am Main, and Wilhelm Querfurth, Oberursel, Germany, assignors to W. C. Heraeus Gesellschaft mit beschränkter Haftung, Hanau (Main), Germany, a corporation of Germany, and Deutsche Gold- und Silber-Scheideanstalt vormals Roessler, Frankfurt am Main, Germany, a corporation of Germany
No Drawing. Filed Dec. 30, 1953, Ser. No. 401,433
Claims priority, application Germany Jan. 2, 1953
3 Claims. (Cl. 260—570.5)

The invention relates to the stabilisation of substituted or unsubstituted aryl-sulphone-alkyl- or -alkanol-amines of the general formula R—$C_6H_4$—$SO_2$—CR'R''—NR'''R'''', in which R, R' and R'' represent hydrogen or a hydrocarbon radical, R''' represents hydrogen, a hydrocarbon radical or the radical of an alkanol and R'''' represents any desired organic monovalent radical, more especially the radical R—$C_6H_4$—$SO_2$—CR'R'', while R' and R'' on the one hand and R''' and R'''' on the other hand may be closed to form a ring, and to mixtures containing these amines. Such aryl-sulphone-alkyl- or -alkanol-amines may, for example, be prepared according to the Meyer process (Journal für praktische Chemie, vol. 63, page 157). These compounds are used as catalysts for the polymerisation of polymerisable organic compounds. All these compounds have only limited storage capacity. This applies more especially when these compounds are brought into contact with polymerisation catalysts which are known per se and which contain oxygen. In many cases, even the presence of atmospheric oxygen is sufficient for this purpose. Tests have shown that, for example, di-(p-tolyl-sulphone-methyl)-methyl-amine in the presence of small quantities of benzoyl peroxide has already changed to such a degree after six months that it can only develop a reduced catalytic action. As a result, the practical utility of the catalyst, which is per se exceptional, is seriously jeopardized.

It has now been found that the aryl-sulphone-alkyl- or -alkanol-amines as characterised above or mixtures containing the same may be stabilised to a high degree by adding small quantities of formaldehyde.

The use of formaldehyde itself is only of theoretical importance. In practice, formaldehyde is used in the form of its polymerisation products, among which paraformaldehyde has proved to be particularly suitable. In this connection, it is expedient to employ polymerisation products of maximum reactivity. Furthermore, it is expedient to select polymerisation products which can be dispersed satisfactorily in the substance to be stabilised or in a mixture thereof with other substances. For example, so-called flaked formaldehyde, because it has a wax-like consistency and is consequently difficult to disperse mechanically in powders, is less suitable for the stabilisation of powdered substances than are other forms of paraformaldehyde. Moreover, α-polyoxymethylene is less suitable owing to its inadequate reactivity. On the other hand, satisfactory experiments have been carried out with commercially available paraformaldehyde and also with that form of paraformaldehyde which has a particularly good water-solubility.

The paraformaldehyde is added in small quantities, which are dependent on the predetermined sulphonamine on the one hand, and on the use thereof on the other hand. The quantities lie in general within the limits of 0.01 to 2% of the substance to be stabilised. In many cases, more especially for pharmaceutical purposes, it is also possible to use even smaller quantities. On the other hand, even larger quantities are not harmful for other purposes of use.

The substances to be stabilised consist of the extremely wide variety of compounds which come within the general formula. For example, secondary or tertiary phenyl- or p-tolyl-sulphone-methyl-alkylamines of the general formula R—$C_6H_4$—$SO_2$—$CH_2$—NR'''R'''', such as p-tolyl-sulphone-methyl-methyl or -dimethyl amine of the following formula:

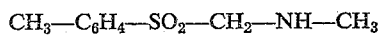

or

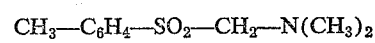

or corresponding mono- or di-ethyl compounds. It is also possible to use amines which are substituted by one or two phenyl groups or also one phenyl radical and one alkyl radical as well as by the aryl-sulphone-alkyl radical. Instead of an amine substituted by the aryl-sulphone-alkyl radical, amines have also proved to be suitable in which the said radical is further substituted in the alkyl, for example methyl, group.

The process according to the invention may be used with particular success on substances of the formula (R—$C_6H_4$—$SO_2$—CR'R'')$_2$NR''', such as di-(p-tolyl-sulphone-methyl)-amine and advantageously di-(p-tolyl-sulphone-methyl)-methyl amine of the formulae

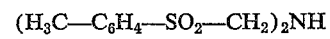

and

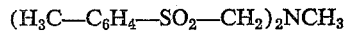

and the corresponding ethyl compounds.

The amine hydrogen atoms may be substituted both by the aryl-sulphone-alkyl radical and by an alkanol, for example ethanol, radical as in di-(p-tolyl-sulphone-methyl)-ethanol-amine of the following formula:

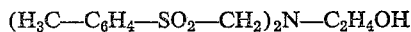

The stabilising process of the invention may be used with particular success in cases where the substances to be stabilised are stored or used in the presence of oxygen catalysts which are known per se, such as inorganic or organic per-compounds, for example, persulphates or dibenzoyl peroxide.

An additional field of use for the invention is the stabilisation of starting materials for the production of polymerisation products from polymerisable organic compounds, which contain the aryl-sulphone-alkyl- or -alkanol-amines either in a monomeric or partially polymerised liquid polymerisable organic compound, or in the form of a partially or completely polymerised solid polymerisable compound, the compound in each case having a doubly linked methylene group. Such polymerisable compounds, include unsaturated hydrocarbons of aliphatic nature, for example butadiene or its derivatives, for example chloro-butadiene, or those of aromatic nature, for example styrene, derivatives of vinyl alcohol, for example vinyl esters or ethers, acrylic acid, methacrylic acid or derivatives thereof, for example esters or allyl compounds. It is possible to stabilise all the polymerisation starting substances from which polymerisation products may be prepared in accordance with U.S. Patent No. 2,750,357 of the two applicant companies. In addition to the aryl-sulphone-alkyl- or -alkanol-amines to be stabilised, these polymerisation products may contain activators and oxygen-containing polymerisation accelerators which are known per se, such as monovalent alcohols according to U.S. Patent No. 2,758,106, multivalent alcohols as in accordance with U.S. Patent 2,776,952, heavy metals or their compounds, more especially salts, advantageously in catalytic quantities, as in accordance with U.S. Patent No. 2,779,751 and/or halogen compounds as in accordance with U.S. Patent No. 2,776,952 of both applicants.

Such mixtures of organic compounds which are to be polymerised and catalysts which are to be stabilised contain the latter in quantities of a few percent. Accordingly, there are employed a few hundredths of a percent up to 1% and more of stabilising agents, calculated on the total mixture.

Little can be said at the present concerning the mechanism of the stabilisation. It is interesting that the splitting off of monomeric formaldehyde from its polymers is not influenced by the presence of the substances to be stabilised, so that the latter or the mixtures thereof with other compounds smell perceptibly of monomeric formaldehyde even after being stored for a short time. At elevated temperature, a smell of trimethylamine may develop. The stabilising effect seems to be caused by influencing the —NR'''R'''', since it is remarkable that neither free sulphinic acids, such as tolyl-paratolyl-sulphinic acid or naphthyl-sulphinic acid, nor the carbinols corresponding to the sulphonamines to be stabilised according to the invention, can be stabilised with paraformaldehyde.

What we claim is:

1. In a process for stabilizing compounds of the general formula:

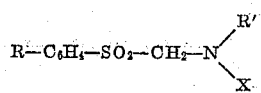

which are used as catalysts for the polymerization of polymerizable organic compounds and in which R is a member selected from the group consisting of hydrogen and alkyl radicals, R' is a member selected from the group consisting of hydrogen, alkyl, alkylaryl, aryl and hydroxyalkyl radicals and X is a member selected from the group consisting of hydrogen, alkyl radicals and the group R—$C_6H_4$—$SO_2$—$CH_2$ and mixtures containing these amines, the improvement consisting in adding polymerized formaldehyde in amount of at least 0.01% based on the amine to be stabilized.

2. Improvement in accordance with claim 1, in which said polymerized formaldehyde is paraformaldehyde.

3. Improvement in accordance with claim 1, in which said polymerized formaldehyde is added in amount of from 0.01 to 2%.

References Cited in the file of this patent

UNITED STATES PATENTS

| 2,140,608 | Ufer | Dec. 20, 1938 |
| 2,140,609 | Ufer | Dec. 20, 1938 |
| 2,549,056 | Chenicek | Apr. 17, 1951 |

OTHER REFERENCES

Karrer: Organic Chemistry, pages 141–145, Nordeman Publishing Co. Inc., New York (1938).